(12) United States Patent
Woloschek et al.

(10) Patent No.: US 12,484,827 B2
(45) Date of Patent: Dec. 2, 2025

(54) SYSTEMS AND METHODS FOR WIRELESSLY OBTAINING A PHYSIOLOGICAL SIGNAL FROM A PATIENT

(71) Applicant: GE Precision Healthcare LLC, Milwaukee, WI (US)

(72) Inventors: Steven Woloschek, Wauwatosa, WI (US); Thomas Valent, Burlington, WI (US); Steven Falk, Baltimore, MD (US); Mohammad Khair, Whitefish Bay, WI (US)

(73) Assignee: GE PRECISION HEALTHCARE LLC, Milwaukee, WI (US)

( * ) Notice: Subject to any disclaimer, the term of this patent is extended or adjusted under 35 U.S.C. 154(b) by 950 days.

(21) Appl. No.: 17/008,191

(22) Filed: Aug. 31, 2020

(65) Prior Publication Data

US 2022/0061689 A1 Mar. 3, 2022

(51) Int. Cl.
*A61B 5/282* (2021.01)
*A61B 5/00* (2006.01)
(Continued)

(52) U.S. Cl.
CPC ............ *A61B 5/282* (2021.01); *A61B 5/0006* (2013.01); *A61B 5/6892* (2013.01);
(Continued)

(58) Field of Classification Search
CPC ..... A61B 5/282; A61B 5/0006; A61B 5/7203; A61B 2560/0214; H04W 4/38;
(Continued)

(56) References Cited

U.S. PATENT DOCUMENTS

| 5,882,300 A | 3/1999 | Malinouskas et al. |
| 7,245,956 B2 | 7/2007 | Matthews et al. |
| (Continued) | | |

FOREIGN PATENT DOCUMENTS

| CN | 206687204 U | * 12/2017 |
| CN | 208876492 U | * 5/2019 |
| (Continued) | | |

OTHER PUBLICATIONS

International Application No. PCT/US2021/047192 filed Aug. 23, 2021—International Search Report and Written Opinion issued on Dec. 9, 2021; 13 pages.

(Continued)

*Primary Examiner* — Carl H Layno
*Assistant Examiner* — Aya Ziad Bakkar
(74) *Attorney, Agent, or Firm* — McCoy Russell LLP

(57) ABSTRACT

Systems and methods are provided for wirelessly obtaining a physiological signal from a patient. In one embodiment, a system comprises a plurality of sensors spaced apart from one another and adapted to measure physiological signals from a patient, and a communication module configured to wirelessly transmit the physiological signals measured by the plurality of sensors to a computing device. In this way, a fabric cover with the plurality of sensors and the communication module integrated therein may be washable and/or disposable while also enabling acquisition of an ECG signal and/or heart rate for neonatal or infant care applications.

15 Claims, 7 Drawing Sheets

(51) Int. Cl.
  *G16Y 10/60* (2020.01)
  *G16Y 20/40* (2020.01)
  *G16Y 40/10* (2020.01)
  *H02J 50/10* (2016.01)
  *H04B 5/26* (2024.01)
  *H04B 5/79* (2024.01)
  *H04W 4/38* (2018.01)
  *H04W 4/80* (2018.01)

(52) U.S. Cl.
  CPC ............ *A61B 5/7203* (2013.01); *G16Y 10/60* (2020.01); *G16Y 20/40* (2020.01); *G16Y 40/10* (2020.01); *H04B 5/26* (2024.01); *H04B 5/79* (2024.01); *H04W 4/38* (2018.02); *H04W 4/80* (2018.02); *A61B 2503/045* (2013.01); *A61B 2560/0214* (2013.01); *H02J 50/10* (2016.02)

(58) Field of Classification Search
  CPC ......... H04W 4/80; G16Y 40/10; G16Y 10/60; G16Y 20/40; H04B 5/0037; H04B 5/0081; H02J 50/10
  See application file for complete search history.

(56) References Cited

U.S. PATENT DOCUMENTS

| | | | |
|---|---|---|---|
| 9,433,366 | B2 | 9/2016 | Baker |
| 2010/0041975 | A1* | 2/2010 | Chen .................. A61B 5/6892 600/509 |
| 2011/0101788 | A1 | 5/2011 | Sun |
| 2014/0106735 | A1* | 4/2014 | Jackson ................ H05B 47/19 455/419 |
| 2016/0056664 | A1* | 2/2016 | Partovi ................ B60L 53/122 307/104 |
| 2017/0303810 | A1* | 10/2017 | Stone .................... A61B 5/6893 |
| 2017/0347960 | A1 | 12/2017 | Falk |
| 2018/0049701 | A1 | 2/2018 | Raisanen |
| 2018/0217006 | A1* | 8/2018 | Choi ........................ G01K 5/52 |
| 2018/0262236 | A1 | 9/2018 | Kahlman |
| 2018/0360324 | A1 | 12/2018 | Lorraine et al. |
| 2019/0336020 | A1* | 11/2019 | Kranz .................... A61B 5/318 |
| 2020/0037954 | A1* | 2/2020 | Hassan-Ali ........ A41D 13/1281 |
| 2020/0253320 | A1* | 8/2020 | Guard .................. A63F 13/245 |
| 2020/0253474 | A1 | 8/2020 | Muhsin |
| 2020/0281496 | A1 | 9/2020 | Obi |

FOREIGN PATENT DOCUMENTS

| | | |
|---|---|---|
| KR | 101227413 B1 | 2/2013 |
| WO | 2020180949 A1 | 9/2020 |

OTHER PUBLICATIONS

EP application 21862496.3 filed Feb. 14, 2023—Search Report issued Aug. 16, 2024; 8 pages.
KR101227413 English Abstract, retrieved from Espacenet.com Nov. 13, 2024, 1 page.

* cited by examiner

SYSTEMS AND METHODS FOR WIRELESSLY OBTAINING A PHYSIOLOGICAL SIGNAL FROM A PATIENT

FIELD

Embodiments of the subject matter disclosed herein relate to an apparatus including a plurality of electrodes.

BACKGROUND

An electrocardiogram (ECG) may provide a measurement of electric signals of the heart. Standard methods for measuring electric potential (e.g., bio-potentials) of a patient, and obtaining an ECG signal of the patient, may include securing electrodes directly to the skin of the patient. For example, a plurality of electrodes may be adhered directly to the skin of the patient via an adhesive. An acquired ECG signal may be used to diagnose heart conditions of the patient, as well as determine a heart rate of the patient. The heart rate may be used for patient monitoring and diagnosis. When used in neonatal or infant care applications (often directly following delivery of the neonate/infant), the ECG signal and/or heart rate may be needed during resuscitation and/or monitoring of the patient for additional interventions.

BRIEF DESCRIPTION

In one embodiment, a system comprises a plurality of sensors spaced apart from one another and adapted to measure physiological signals from a patient, and a communication module configured to wirelessly transmit the physiological signals measured by the plurality of sensors to a computing device. In this way, a fabric cover with the plurality of sensors and the communication module integrated therein may be washable and/or disposable while still enabling acquisition of an ECG signal and/or heart rate for neonatal or infant care applications.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 3:
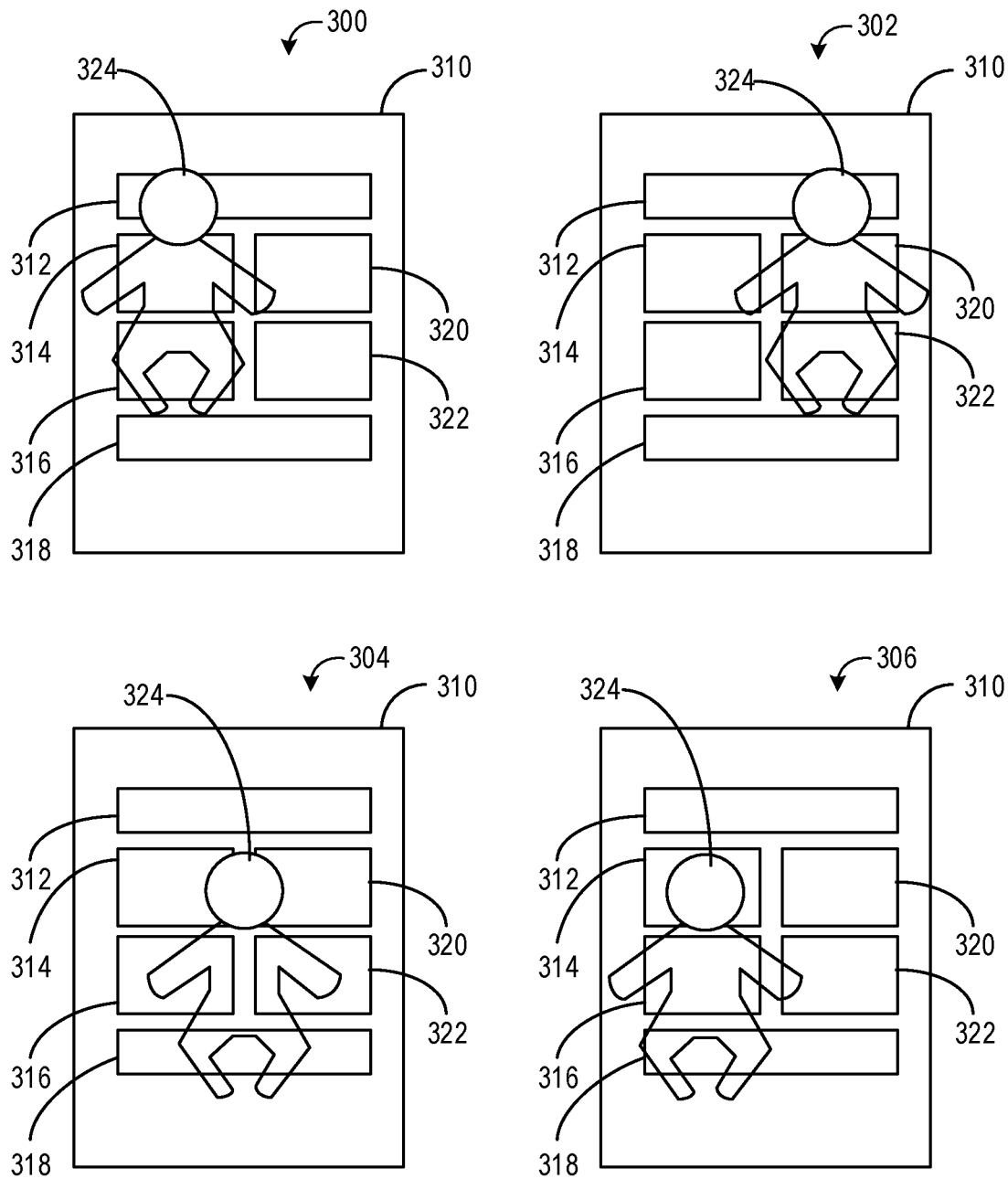
FIG. 3 shows a schematic of example positions of a patient on a fabric cover including a plurality of integrated sensors for measuring bio-potentials of the patient.
Figure 4:
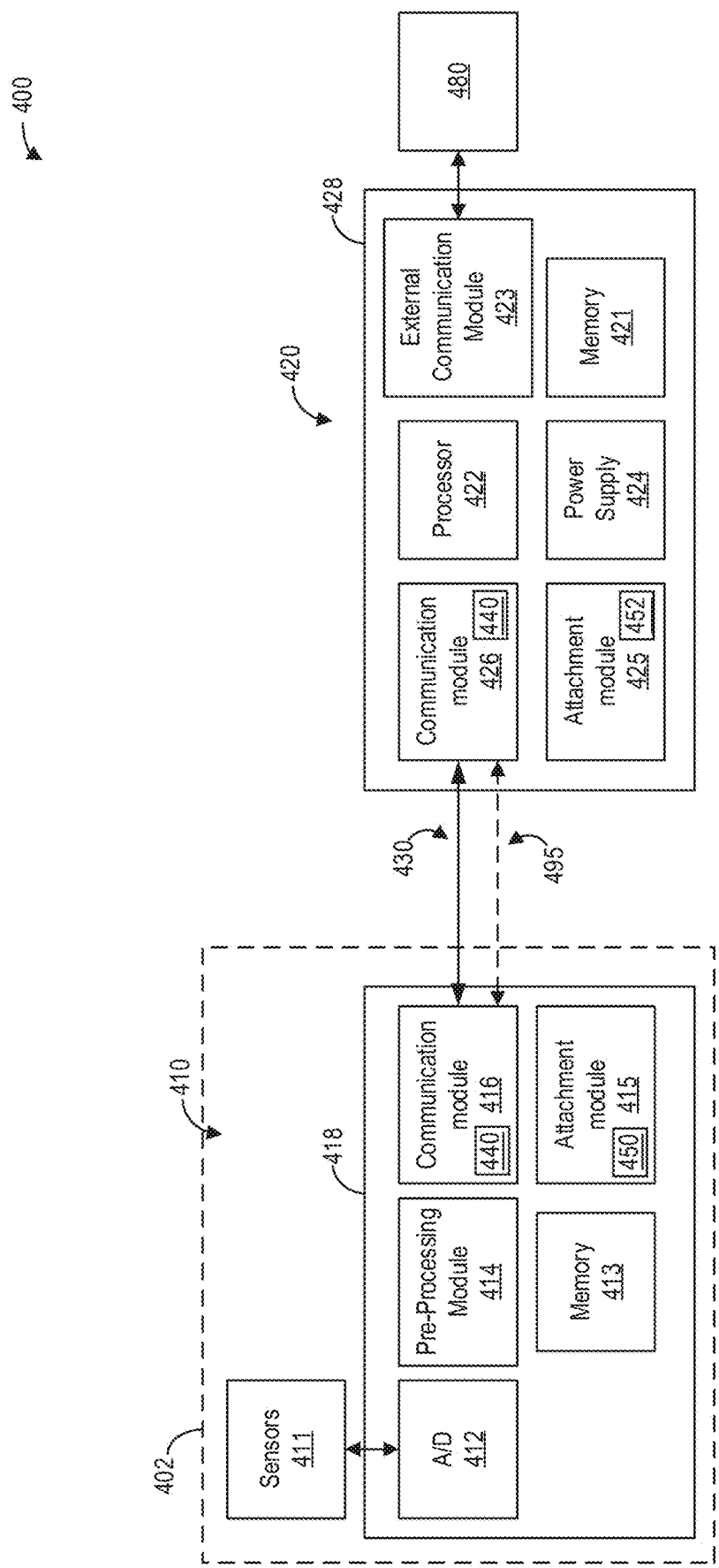
FIG. 4 shows an example block diagram of an example system for wirelessly obtaining physiological data from a medical device (e.g., a fabric cover with integrated sensors) via an inductive coupling.
Figure 6:
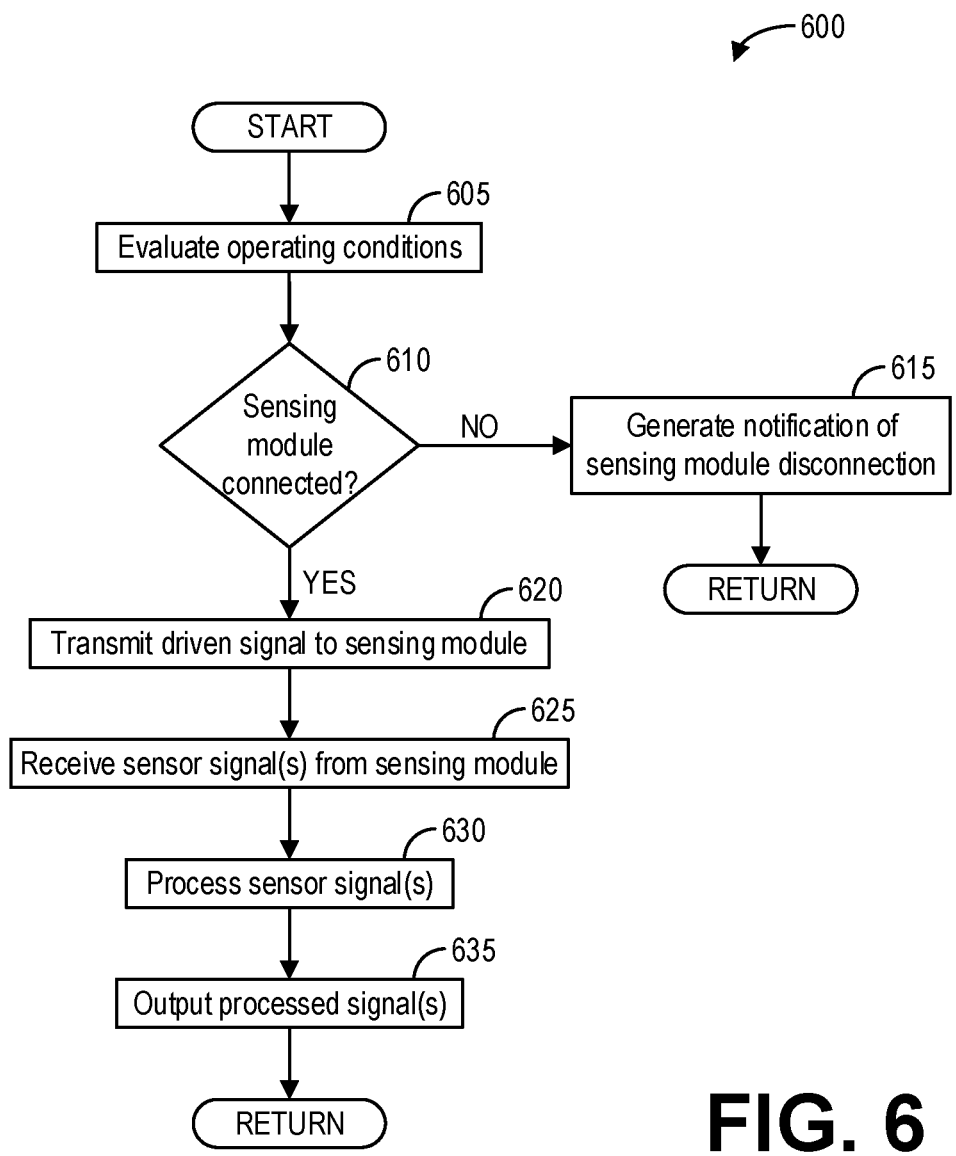
FIG. 6 shows a high-level flow chart illustrating an example method for processing physiological data wirelessly received via an inductive coupling.
Figure 7:
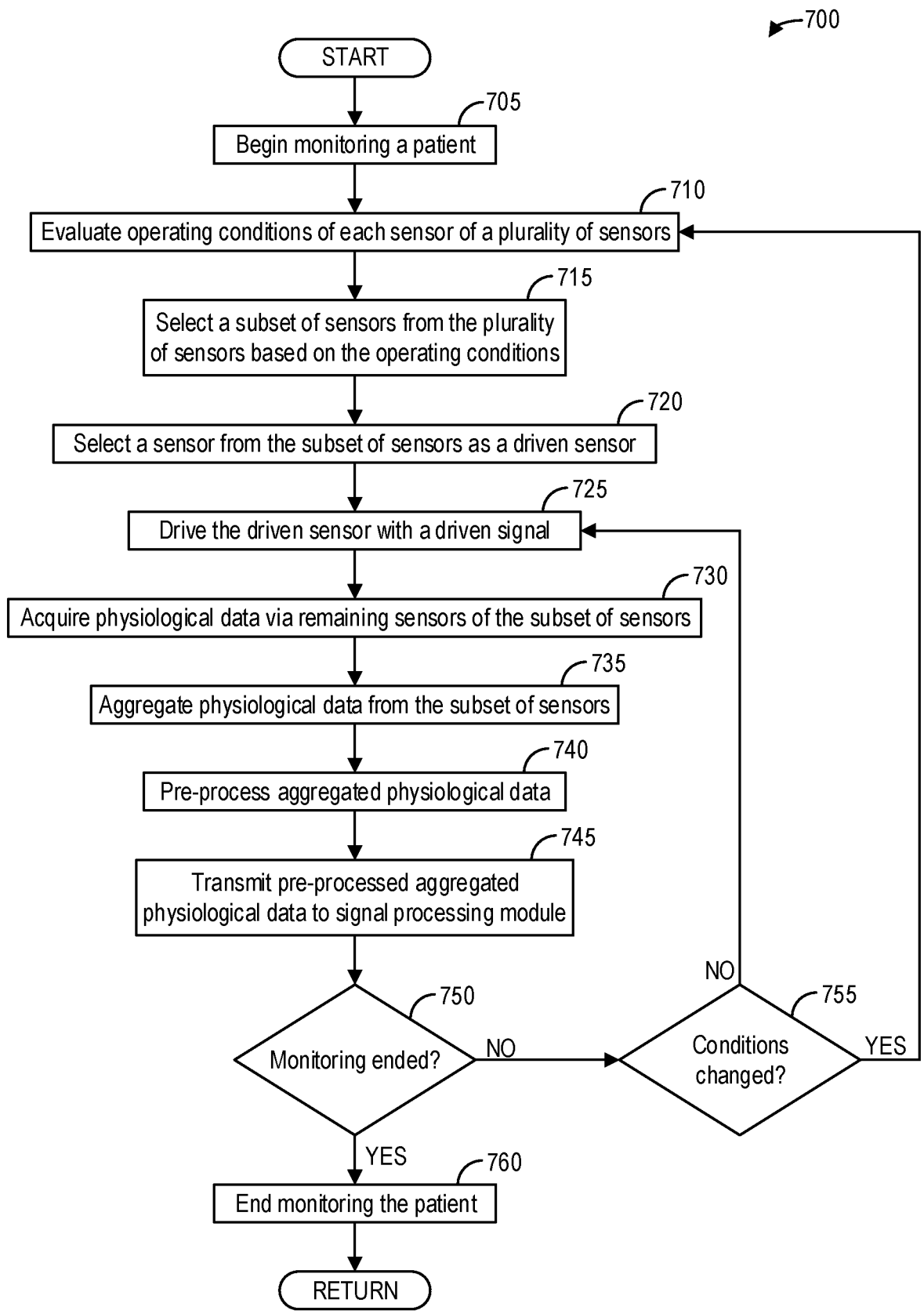
FIG. 7 shows a high-level flow chart illustrating an example method for dynamically acquiring physiological data from a plurality of sensors while monitoring a patient.

The following description relates to various embodiments of an apparatus including a plurality of electrodes for measuring an electrocardiogram signal of a patient in direct contact with at least a subset of the plurality of electrodes. For monitoring and care of a patient, such as a neonate or infant, an electrocardiogram (ECG) and/or heart rate signal of the patient may be acquired and displayed to a user (e.g., medical professional). As introduced above, standard electrodes for measuring an ECG signal of a patient may be adhered to the skin of the patient. However, such electrodes which are stuck to the skin of the patient may cause irritation, inflammatory response, or damage to the more delicate skin of neonates or infants, especially premature birth neonates. Further, it may take a while for a medical professional to attach all the ECG leads (e.g., electrodes). However, the time to attach the ECG electrodes is often critical for administering essential and life-saving care to the neonate or infant. In one example, after birth, a neonate or infant may be placed in a neonate or infant care environment (which may include a bassinet, warmer, or incubator), on top of a platform or mattress. An apparatus, such as a fabric cover (which may be in the form of a blanket, bed sheet, or mattress cover in some embodiments) may include a plurality of electrodes (also referred to herein as sensors) attached or integrated therein. The fabric cover including an arrangement of electrodes may then be positioned in direct contact with the patient (e.g., placed on top of the mattress, with the patient lying directly on the fabric cover). When the patient is placed on the fabric cover with electrodes embedded therein, for example, a signal processing circuit, such as the signal processing circuit shown in FIG. 2, may automatically and immediately start acquiring bio-potential or physiological signals of the patient. Though the electrodes of the fabric cover may be in direct contact with the skin of the patient, they may not be physically adhered (e.g., stuck) to the patient. As a result, as shown in FIG. 3, the patient may be able to move around across a surface of the electrodes and fabric cover, thereby changing which electrodes of the fabric cover are in direct contact with the skin of the patient. The electrodes may be arranged in an array and include a plurality of measurement electrodes (adapted to measure bio-potentials or physiological signals of the patient) and one or more driven electrodes (adapted to output a driven, common-mode output signal to reduce noise of the measured bio-potential signals). The acquired bio-potential or physiological signals may then be used to determine an ECG signal and/or heart rate of the patient. As shown by FIG. 4, physiological data acquired by the sensors integrated into the fabric cover may be wirelessly transmitted, via an inductive coupling, to a signal processing circuit or module. In this way, the reusability of the fabric cover for monitoring patients may be improved by reducing the electrical components within the fabric cover for acquiring the physiological signals, while further allowing easy connection of the fabric cover to a monitoring system. A method for operating the fabric cover, such as the method shown in FIG. 5, may include determining whether the inductive coupling is established, and wirelessly transmitting measured bio-potentials or even pre-processed physiological data via the inductive coupling. The signal processing module may then, as shown in FIG. 6, wirelessly receive the physiological signals via the inductive coupling and perform additional processing and monitoring actions. As shown in FIG. 7, the dynamic selection of sensors or electrodes, for example to accommodate scenarios when the patient moves on the fabric cover, may be performed at the fabric cover rather than the signal processing module. As a result, a more accurate ECG signal with reduced noise may be wirelessly obtained, even while a patient moves around on top of or against the fabric cover. This system may have minimal, passive contact with the patient, while still allowing for direct contact with the skin of the patient. As a result, an impact to the infant/neonate may be reduced.

Figure 1:
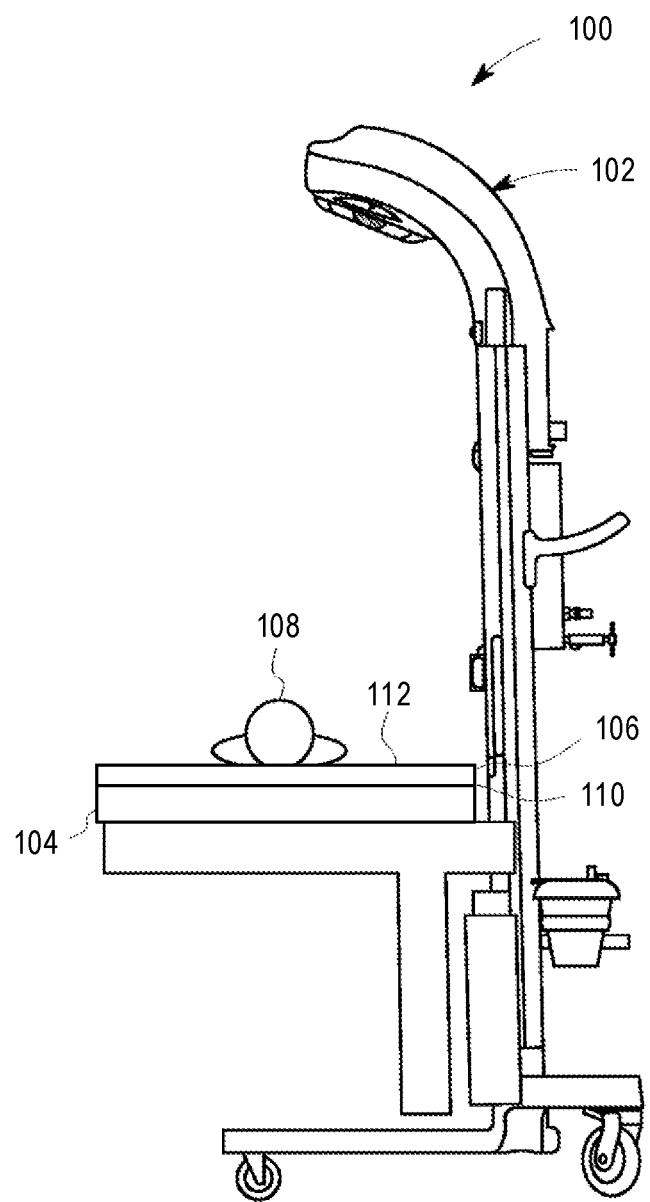
FIG. 1 shows an example of a neonate or infant care environment including a fabric cover with integrated sensors for direct contact with a patient.

FIG. 1 shows an example of a neonate or infant care environment including a fabric cover with incorporated (e.g., integrated in one embodiment) sensors for direct contact with a patient. Specifically, FIG. 1 shows a neonatal or infant care environment 100. As shown in FIG. 1, environment 100 may include a neonate/infant radiant warmer 102, which may be referred to as a baby warmer that may include a mattress 104 for supporting a patient 108 (e.g., a neonate or infant). In alternate embodiments, environment 100 may be an incubator. In alternate embodiments, environment 100 may be a bassinet. The incubator and/or warmer and/or bassinet may be used in the neonatal intensive care unit (NICU) and/or right after labor and delivery of an infant.

An apparatus 110 having a sensor array is positioned between the mattress 104 and the patient 108. As used herein, the sensor array and sensors may also be referred to as an electrode array and electrodes, respectively. In the example shown in FIG. 1, the apparatus 110 is a fabric cover 106 that is positioned on/over the mattress 104 such that a top surface 112 of the fabric cover 106 is in direct contact with the patient 108. The fabric cover 106 includes a plurality of electrodes (e.g., sensors) integrated therein for measuring bio-potentials of the patient 108. As described further below, the plurality of electrodes may be arranged on the top surface 112 such that they may have direct contact with the skin of the patient 108. In one example, the fabric cover 106 may be a type of mattress pad or bed sheet. In another example, the fabric cover 106 may be a blanket.

As described further herein, the apparatus 110 may provide electrocardiogram (ECG) monitoring of patients such as neonates or infants. Apparatus 110 may consist of multiple sensors (e.g., electrodes) defining an array of sensors integrated with a remainder of the apparatus 110 (e.g., integrated with or sewn into a fabric of the fabric cover 106). The apparatus 110 may be transportable and reusable (e.g., washable). Further, the apparatus 110 may be inserted under the patient, such as a neonate or infant, and upon any surface, such as a blanket, mattress (as shown in FIG. 1), or mother's chest or abdomen. For example, the apparatus 110 may be integrated into a kangaroo care/wearable, skin-to-skin application, such as a sling, halter, wrap, nursing top, and the like. As described further below, apparatus 110 may include electronics for direct contact measurement of bio-potentials (e.g., heart rate), signal conditioning and processing, and/or wired or wireless communication with additional electronics, processors, or control units. Apparatus 110 may be configured for rapid measurement of ECG signals, even in the case where there is movement of the patient across the surface of the apparatus 110 (such that the patient changes which sensors/electrodes of the apparatus 110 are in direct contact with the patient). For example, apparatus 110 may enable measurement of ECG signals through motion artifacts associated with the patient's movements on the apparatus 110 (e.g., on the bed sheet or blanket).

Figure 2:
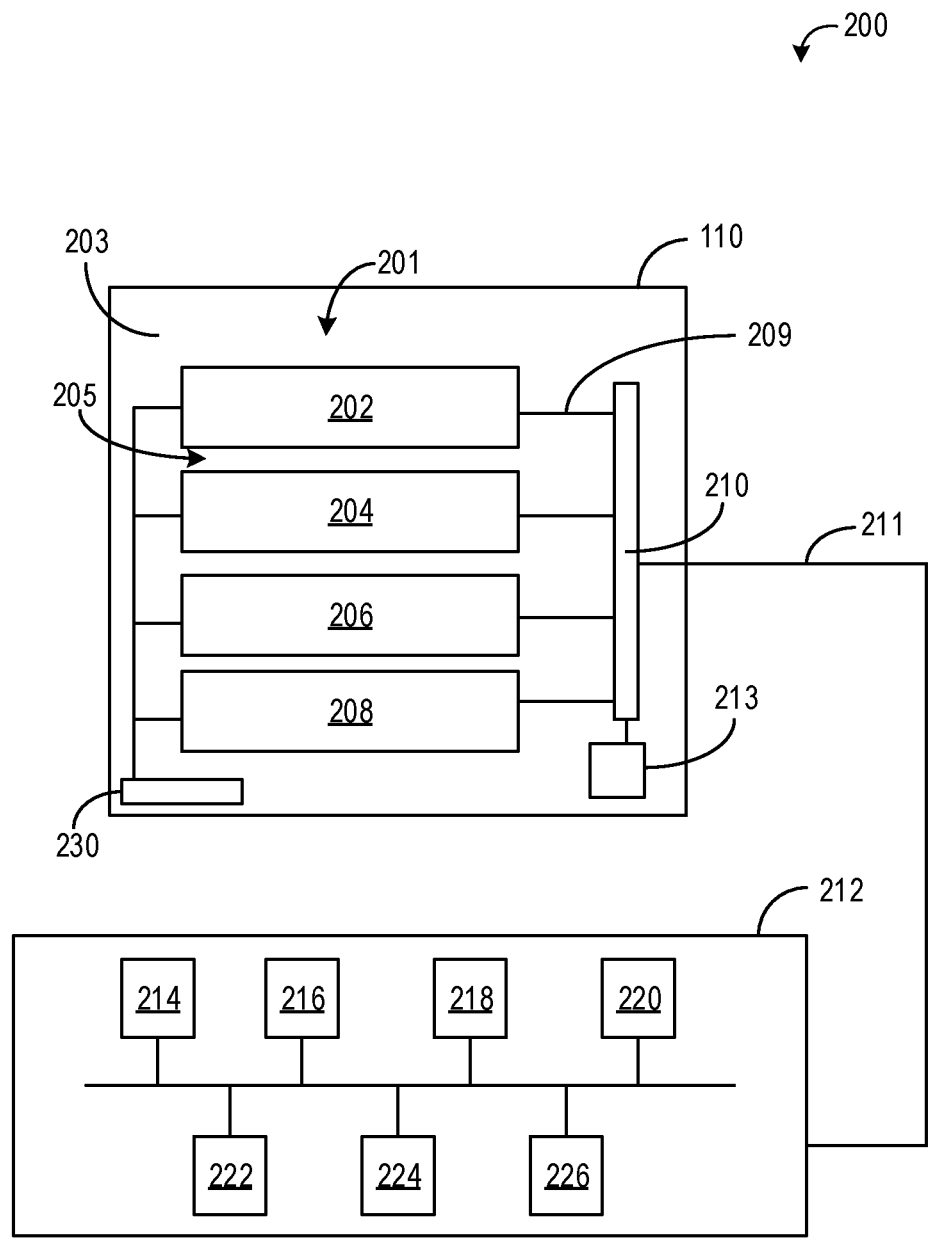
FIG. 2 shows an example block diagram of a system for measuring bio-potentials of a patient including an apparatus having a sensor array and a signal processing circuit.

FIG. 2 shows an example block diagram of a system 200 for measuring bio-potentials of a patient (e.g., neonate or infant) including an apparatus 110 having a sensor array 201 and a signal processing circuit 212. The apparatus 110 may be a fabric cover (such as fabric cover 106 shown in FIG. 1, which may be a bed sheet, mattress cover, and/or blanket, in some embodiments, or such as a fabric cover configured as a halter, sling, wrap, or the like). Thus, apparatus 110 may be or include a fabric base 203 with a plurality of individual sensors or electrodes (202, 204, 206, and 208) of the sensor array 201 integrated (e.g., embedded, sewn, incorporated, or affixed in some way) therein. As shown in FIG. 2, sensor array 201 includes four individual sensors 202, 204, 206, and 208, all spaced apart from one another (e.g., not touching or directly contacting one another) via a gap (e.g., distance) 205. However, in alternate embodiments, sensor array 201 may include more or less than four individual sensors (e.g., two, three, five, eight, ten, etc.). The individual sensors of sensor array 201 may be arranged in a pattern. For all patterns, the individual sensors may be spaced apart from one another so that an amount of fabric of the fabric base 203 electrically insulates adjacent sensors from one another. In this way, electrical signals are not transferred between sensors.

In one embodiment, each of the sensors of sensor array 201 may be an electrode adapted to measure bio-potentials of the patient in direct contact with a surface of the sensors. The sensors (e.g., sensors 202, 204, 206, and 208) may also be referred to herein as ECG sensors since they are adapted to measure electrocardiogram (ECG) signals from the patient and determine a heart rate of the patient based on the measured signals. Sensor array 201 may include a plurality of measurement electrodes (e.g., which receive and measure ECG signals from the patient) and one or more dedicated, driven electrodes (e.g., which output a driven common mode output signal to the patient). In some examples, each of the measurement electrodes may be switched to be a driven electrode (e.g., switched from receiving bio-potential signals from the patient to delivering the common mode output signal to the patient). However, all of the dedicated, driven electrodes may remain driven electrodes and may not be switchable to measurement electrodes. In this way, the electrodes designated as dedicated, driven electrodes may only be used to output the driven common mode output signal and may not be used for measuring bio-potentials of the patient. As described further below, at any one time, one or multiple sensors may be selected to actively be the driven electrode and deliver the driven, common mode output signal. In one embodiment, first sensor 202, second sensor 204, and third sensor 206 may be measurement electrodes while fourth sensor 208 is a dedicated, driven electrode. In another embodiment, first sensor 202 and second sensor 204 may be measurement electrodes while third sensor 206 and fourth sensor 208 are dedicated, driven electrodes. In yet another embodiment, each of first sensor 202, second sensor 204, third sensor 206, and fourth sensor 208 may be measurement sensors adapted to be individually switched to functioning as a driven electrode. In yet another embodiment, each of first sensor 202, second sensor 204, third sensor 206, and fourth sensor 208 may be measurement sensors and where second sensor 204 and third sensor 206 are adapted to be both switched to functioning as a driven electrode. In this way, different combinations of measurement and driven electrodes included in sensor array 201 are possible.

Each individual sensor (202, 204, 206, and 208) is electrically coupled to an electronic connector 210 via a different electrical connection 209. In one embodiment, the electrical connections 209 may be conductive threads woven or imbedded within the fabric base 203. In this way, electrical signals may be passed back and forth between the individual sensors and the connector 210. For example, signals received by measurement electrodes from the patient may be transferred to the connector 210 via corresponding electrical connections 209 and the driven common mode output signal may be sent to the driven electrode from the connector 210 via corresponding electrical connection 209. A single connector 210 is shown in FIG. 2. However, in alternate embodiments, there may be multiple connectors (e.g., one for each individual sensor of sensor array 201).

The signal processing circuit 212 of system 200 is electrically coupled to the connector 210 (or connectors) via a wireless connection 211. As described further herein with regard to FIG. 4, the connection 211 may comprise an inductive coupling between the signal processing circuit 212 and the apparatus 110. In some embodiments, select parts of the signal processing circuit 212 may be included within apparatus 110 and the processed signals may be transferred via a wireless connection to additional processing electronics or a remote data acquisition and/or display device. In this embodiment, the connector(s) 210 may be omitted. Alternatively or additionally, the apparatus 110 may include an integrated electronic layer 213 electrically coupled to (and/or included within) the connector 210 and adapted to perform measurements on electrical signals received from the plurality of sensors. For example, the integrated electronic layer may include one or more components of signal processing circuit 212 and/or a dynamic switching circuit. In another embodiment, as shown in FIG. 2, all the components of the signal processing circuit 212 may be located separate (e.g., remote) from the apparatus 110 and thus the connector(s) 210 and wireless connection 211 may transfer electrical signals (acquired measurements and the driven signal) between the apparatus 110 and the signal processing circuit 212. In some embodiments, the connector 210 may include a wireless pod including a transmitter/receiver for transferring wireless signals between the apparatus 110 and the signal processing circuit 212. In another embodiment, apparatus 110 may include a separate wireless pod electrically coupled with the connector 210 or each individual sensor of sensor array 201. In still another embodiment, such as when the sensors and/or connector 210 are wirelessly connected to the signal processing circuit 212, the sensors may receive electrical power via a battery 230 incorporated into the apparatus 110 (e.g., incorporated into the fabric cover). Alternatively, as discussed further herein with regard to FIG. 4, the apparatus 110 may not include the battery 230 and may instead wirelessly receive power via the inductive coupling or wireless connection 211 between the apparatus 110 and the signal processing circuit 212.

In one embodiment, signal processing circuit 212 may be processor based. In one embodiment, signal processing circuit 212 may include one or more input/output interface devices 214 for communication with, e.g., sensors 202, 204, 206, and 208 of sensor array 201, and/or one or more external processing circuits. One or more input/output interface devices 214 may include associated analog to digital and or digital to analog circuitry for facilitating bi-directional signal communication with sensor array 201. Signal processing circuit 212 may also include one or more central processing units (CPU) 216, one or more memory devices 218 (e.g. a random access memory (RAM) and/or cache memory, which may be volatile), one or more storage devices (e.g., non-volatile storage devices) 220, and one or more output devices 222. One or more memory devices 218 and/or one or more storage devices 220 may define a tangible computer readable storage medium of signal processing circuit 212. Signal processing circuit 212 may also include a power supply 224 which may be a battery-based power supply to facilitate mobile operation of signal processing circuit 212. One or more output devices 222, in one embodiment, may be provided, e.g., by one or more of a display with or without an associated touch screen and/or one or more audio output devices (e.g., a speaker). Devices 214, 216, 218, 220, 222, and 224, in one embodiment, are in communication via a system bus 226. Signal processing circuit 212 may output data via an output device 222 which may include a bus-connected output device, as shown in FIG. 2 and/or to an output device of apparatus 110 which is provided as an output device in communication with signal processing circuit 212 via input/output interface device 214.

Turning now to FIG. 3, a schematic is shown of example positions of a patient 324 on a fabric cover 310. Fabric cover 310 may be similar to apparatus 110 and/or fabric cover 106 discussed above with reference to FIGS. 1-3. As discussed above, the fabric cover 310 includes a plurality of integrated ECG sensors 312, 314, 316, 318, 320, and 322 which may be referred to herein as electrodes or electrode pads. Each of the ECG sensors are spaced apart from one another such that they are electrically insulated from one another (and thus cannot pass signals between one another, thereby reducing signal interference between ECG sensors) via the intervening fabric of the fabric cover 310. FIG. 3 shows an example arrangement of ECG sensors on a surface of the fabric cover 310 which is not meant to be limiting and other arrangements of ECG sensors are possible. As shown in the example of FIG. 3, the ECG sensors include a topmost ECG sensor 312, a top-left ECG sensor 314, a bottom-left ECG sensor 316, a bottommost ECG sensor 318, a bottom-right ECG sensor 322, and a top-right ECG sensor 320. The patient 324 may be smaller than the fabric cover 310 and thus may move around on top of and across the surface of the fabric cover 310. As such, at different points in time, the skin of the patient may be in contact with different ECG sensors of fabric cover 310. Thus, the dynamic switching circuit of the sensing module included in the fabric cover 310 may switch, in real-time (e.g., dynamically), which ECG sensors are selected as the measurement electrodes and driven electrode for producing the patient's ECG signal and determining the patient's heart rate, based on the patient's position on the fabric cover 310 (as determined according to the method described herein with reference to FIG. 7).

Specifically, FIG. 3 shows a first view 300 of the patient (e.g., neonate or infant) 324 in a first position on the fabric cover 310 (e.g., top-left corner). In this first position, the patient 324 is in contact with the topmost ECG sensor 312, the top-left ECG sensor 314, and the bottom-left ECG sensor 316. While a small portion of the patient's arm may be contacting top-right sensor 320, there may not be enough skin-to-electrode contact to produce a strong enough skin impedance and measurement signal. Thus, the dynamic switching circuit of the fabric cover 310 may select ECG sensors 312, 314, and 316 as the contacting sensors (e.g., the ECG sensors having direct, face-sharing contact with a portion of the skin of the patient 324). One of the contacting ECG sensors 312, 314, and 316 may be selected to be the driven electrode (sensor) while the remaining two are selected as the measurement electrodes. Signals from the remaining ECG sensors (318, 320, 322), which are determined to be non-contacting ECG sensors, may be discarded (or not acquired) and not used to determine the ECG signal and heart rate of the patient. In one embodiment, ECG sensors 316 and 322 may be dedicated, driven electrodes. Thus, the dynamic switching circuit may automatically select bottom-left ECG sensor 316 to deliver the driven common mode output signal. In alternate embodiments, a different one or more of the ECG sensors of fabric cover 310 may be dedicated, driven electrodes. In yet another embodiment, all of the ECG sensors of fabric cover 310 may be measurement electrodes (e.g., none are dedicated to being driven only) adapted to switch between being measurement and driven electrodes (as determined and selected by the dynamic switching circuit). However, by including some dedicated driven electrodes and some switchable measurement electrodes, an electrode surface area is provided that is always available for common mode noise reduction if all of the measurement electrodes can be used to capture the ECG signal (e.g., because the measurement electrodes have good patient contact), which may improve signal processing outcomes to mitigate motion and noise artifacts using adaptive filtering by the CPU. Further, more ECG channels may improve the adaptive filtering outcomes, while using the measurement electrodes for providing the driven output reduces the number of channels available for signal processing post digitization, and thus it may be desirable to provide the dedicated, driven electrodes so that all possible channels may be available for the ECG signal acquisition.

FIG. 3 also shows a second view 302 of the patient 324 in a second position on the fabric cover 310 (e.g., top-right corner). In one example, the patient 324 may have moved from the first position (in first view 300) to the second position (in second view 302), thereby changing which of the ECG sensors the patient 324 is in direct, physical contact with (and thus changing the contact points of fabric cover 310). In this second position, the patient 324 is in contact with the topmost ECG sensor 312, top-right ECG sensor 320, and bottom-right ECG sensor 322. Thus, patient 324 is no longer contacting ECG sensors 314 and 316 and is newly contacting ECG sensors 320 and 322. Thus, in one example, the dynamic switching circuit may switch the driven electrode to be the bottom-right ECG sensor 322 (from the bottom-left ECG sensor 316 in first view 300), in response to the patient moving positions on the fabric cover 310 and changing which ECG sensors are contacting sensors. Further, the dynamic switching circuit may continue to use the topmost ECG sensors 312 as one measurement electrode and switch to using the top-right ECG sensor 320 (instead of the bottom-right ECG sensor 316, as used in first view 300) as a second measurement electrode.

In a third view 304 of FIG. 3, the patient 324 is in a third position on the fabric cover 310 (e.g., central-bottom region). In one example, the patient 324 may have moved from the second position (in second view 302) to the third position (in third view 304), thereby changing which of the ECG sensors the patient 324 is in direct, physical contact with (and thus changing the contact points of fabric cover 310). In this third position, the patient 324 is in contact with the top-left ECG sensor 314, the bottom-left ECG sensor 316, the bottommost ECG sensor 318, the bottom-right ECG sensor 322, and the top-right ECG sensor 320. Thus, patient 324 is no longer contacting the topmost ECG sensor 312, remains in contact with ECG sensors 320 and 322, and is newly contacting ECG sensors 314, 316, and 318 (as compared to second view 302). Thus, in one example, the dynamic switching circuit may maintain the driven electrode as the bottom-right ECG sensor 322 and not switch the driven electrode to a different ECG sensor. Further, the dynamic switching circuit may continue to use the top-right ECG sensor 320 as one measurement electrode and switch to using the top-left ECG sensor 314 and bottommost ECG sensor 318 as additional measurement electrodes. In the case where the bottom-left ECG sensor 316 is a dedicated, driven electrode, it may be used to apply the driven common mode output signal, in addition to the bottom-right ECG sensor 322 that is currently selected as the driven electrode.

In a fourth view 306 of FIG. 3, the patient 324 is in a fourth position on the fabric cover 310 (e.g., bottom-left). In one example, the patient 324 may have moved from the third position (in third view 304) to the fourth position (in fourth view 306), thereby changing which of the ECG sensors the patient 324 is in direct, physical contact with (and thus changing the contact points of fabric cover 310). In this fourth position, the patient 324 is in contact with the top-left ECG sensor 314, the bottom-left ECG sensor 316, and the bottommost ECG sensor 318. Thus, patient 324 is no longer contacting the top-right ECG sensor 320 and bottom-right ECG sensor 322 (e.g., even though a small portion of patient 324 is shown contacting sensor 322, not enough of the patient's skin is in contact with sensor 322, so the measured skin impedance of this sensor is below the threshold level) and remains in contact with ECG sensors 314, 316, and 318 (as compared to third view 304). Thus, in one example, the dynamic switching circuit may switch the driven electrode to be the bottom-left ECG sensor 316 (from the bottom-right ECG sensor 322). Further, the dynamic switching circuit may continue to use the top-left ECG sensor 314 and bottommost ECG sensor 318 as measurement electrodes.

In all of the views of FIG. 3, at least two contacting ECG sensors are selected as measurement electrodes and a different, one contacting ECG sensor is selected as the driven electrode. As such, the patient's ECG signal may be obtained with reduced noise (e.g., reduced noise from motion of the patient) from the acquired signals. As shown in the example of FIG. 3, the ECG sensors used as measurement electrodes and the driven electrode may be selected based on which sensors are determined to be directly contacting the skin of the patient and dynamically switched as the patient moves across the fabric cover, into different contacting positions, at least under some conditions. For example, the dedicated driven electrodes are fixed per the connection to the signal processing circuit 212 via wired or wireless connection 211. The dedicated driven electrodes are always enabled and driven. If using the impedance measurement it is sensed that the driven electrodes are not in contact with the patient, the system may then select which measurement electrodes are to be used for driving the output signal. Which sensors are selected and used as the driven electrode and measurement (e.g., input) electrodes may be switched at any time during operation of the fabric cover (e.g., while the patient is on and/or in contact with the fabric cover). For example, switching of measurement and driven electrodes may be performed prior to the initial acquisition of the ECG signal (from the measurement electrodes). In another embodiment, switching of the measurement and driven electrodes may occur during ECG acquisition (e.g., while measurement signals are being acquired from the measurement electrodes), in response to determining the contacting ECG sensors have changed (e.g., the ECG sensors currently being used for determining the ECG signal are no longer in contact with the patient and need to be switched to other sensors that are in contact with the patient).

As shown in FIG. 3, multiple contacts between the patient and ECG sensor pads are made instantaneously upon application of the patient (e.g., infant/neonate) to a surface of the fabric cover. While the multiple contacts are direct contact points between the skin of the patient and the ECG sensor pads, none of the ECG sensor pads are stuck or mechanically adhered to the patient's skin (e.g., via an adhesive), thereby reducing damage and irritation to the infant/neonate's delicate skin. As also seen in the different views of FIG. 3, the patient is free to move over the surface of the fabric cover and sensor array. As such, the position of the patient on the sensor array may change, and thus which electrodes are in contact with the patient's skin may also change during operation/data collection. As discussed above and further below with regard to FIG. 7, the measurement and driven electrodes of the sensory array may be selected and switched according to this movement and change in the contacting sensors.

FIG. 4 shows a block diagram of an example physiological data acquisition system 400 for measuring and transmitting bio-potentials or physiological signals of a patient (e.g., neonate or infant). The physiological data acquisition system 400 comprises a sensing module 410 configured to sense or measure the bio-potentials of the patient. The sensing module 410 may comprise, for example, the apparatus 110 described hereinabove. The physiological data acquisition system 400 further comprises a signal processing module 420, which may comprise the signal processing circuit 212 described hereinabove, configured to process the bio-potentials or physiological signals measured via the sensing module 410. To that end, the sensing module 410 is communicatively coupled to the signal processing module 420. In particular, communication between modules 410 and 420 is conducted wirelessly via a system allowing for wireless transfer of power and signals, for example, such as coils providing an inductive coupling between the modules 410 and 420. In this way, power and data can be transmitted between the modules 410 and 420 without the use of unreliable, fragile, and/or expensive pin connections. Furthermore, the signal processing module 420 is detachable from the sensing module 410. In this way, the sensing module 410 (which may contain less expensive or reusable components) to be washable or disposable. At the same time, the signal processing module 420 may be reused on multiple devices or in multiple locations on the same device while containing more expensive, less durable components for further processing and wireless communication. The signal processing module 420 can also communicate wirelessly with an output device 480 via an external communication device or module 423, such as a radio.

The sensing module 410 comprises at least one sensor 411. In some examples, the sensing module 410 may comprise a plurality of sensors including the sensor 411. The plurality of sensors 411 may be distributed throughout a fabric cover 402, for example as described hereinabove with regard to FIGS. 2 and 3. That is, the plurality of sensors 411 may be arranged as a sensor array with the plurality of sensors 411 spaced apart from one another across a surface of the fabric cover 402. The sensor or sensors 411 may comprise ECG electrodes.

The sensing module 410 further comprises an analog-to-digital (A/D) converter 412 for converting analog signals sensed by the sensor 411 to digital signals. In examples wherein the sensing module 410 comprises a plurality of sensors 411, the A/D converter 412 may comprise a multi-channel A/D converter 412 configured to convert each signal from each respective sensor 411 of the plurality of sensors 411 from analog to digital. In other examples, the sensing module 410 may include an A/D converter 412 for each sensor 411.

In some embodiments, the sensing module 410 optionally comprises a pre-processing module 414 configured to pre-process the signals acquired via the sensor(s) 411. For example, the pre-processing module 414 may receive the digital signals from the A/D converter 412. In one embodiment, to pre-process the signals acquired via the sensor(s) 411, the pre-processing module 414 processes the acquired signal(s) from the sensor(s) 411 to optionally compress the acquired signal(s) in accordance with bandwidth limitations of the wireless data communication link between the sensing module 410 and the signal processing module 420, and transmits the ECG signal(s), in acquired, down-sampled, or compressed form to the signal processing module 420. An example method for pre-processing the acquired signal(s) as well as evaluating data fidelity as described further herein with regard to FIG. 5. In an additional or alternative embodiment, the pre-processing module 414 aggregates a plurality of signals from a plurality of sensors 411 and transmits the aggregated signals to the signal processing module 420. In such examples wherein the pre-processing module 414 acquires data from a plurality of sensors 411, the pre-processing module 414 may perform dynamic sensor selection such that a subset of acquired signals from the plurality of sensors 411 are transmitted to the signal processing module 420. An example method for aggregating a plurality of signals and performing dynamic sensor selection is described further herein with regard to FIG. 7. In this way, the pre-processing module 414 of the sensing module 410 may comprise the dynamic switching circuit described hereinabove with regard to FIG. 3. The pre-processing module 414 may comprise one or more of a processor, an application-specific integrated circuit, or another suitable electrical circuit configured to perform pre-processing of physiological signals and/or the control of the sensing module 410 as described further herein.

In some examples, the sensing module 410 further comprises a memory 413. The memory 413 may comprise non-transitory memory, for example, storing executable instructions that are executable by the pre-processing module 414. In some examples, the memory 413 may store some portion of data from the sensors 41 in the event of loss of signal from the sensors 411 or the loss of the inductive coupling 430, so that continuous output can be maintained. Furthermore, with regards to the device presented in FIG. 3, the memory 413 may be used to maintain signal continuity if the patient shifts from one sensor to another.

In some examples, the sensing module 410 further comprises a housing 418 adapted to surround and enclose the components of the sensing module 410 to protect them from damage and provide for reusability. In one embodiment, with regards to the device presented in FIGS. 1-3, the sensors 411 of the sensing module 410 may be distributed through a fabric cover or blanket, while the remaining components of the sensing module 410 such as the pre-processing module 414 and the communication module 416 may be housed within the housing 418. The housing 418 may be sealed from external elements such as liquid, for example, such that the fabric cover 402 may be washed without damaging the components of the sensing module 410 housed within the housing 418.

The sensing module 410 is detachably coupleable to the signal processing module 420 via an attachment module 415. Similarly, the signal processing module 420 is detachably coupleable to the sensing module 410 via an attachment module 425. In some embodiments, the attachment modules 415 and 425 may comprise a mechanical attachment coupling, such as a latch or linkage. However, as the sensing module 410 may be integrated into the fabric cover 402, such a mechanical coupling between the sensing module 410 and the signal processing module 420 may not be possible as the fabric cover 402 may prevent direct face-sharing contact between the sensing module 410 and the signal processing module 420. Therefore, in some embodiments, the attachment module 415 and the attachment module 425 may each comprise one or more magnets. The attachment ensures that sensing module 410 remains attached to the signal processing module 420 regardless of whether the patient unexpectedly moves on the fabric cover 402, for example. The attachment modules 415 and 425 may be positioned in the sensing module 410 and the signal processing module 420 such that when the modules 410 and 420 are positioned adjacent to each other, the modules 410 and the 420 are detachably coupled via the attachment modules 415 and 425. Further, the positioning of the attachment modules 415 and 425 may be configured such that the communication modules 416 and 426 are spatially aligned and within a threshold distance of each other, thereby enabling an inductive coupling 430 therebetween, when the attachment modules 415 and 425 are coupling the sensing module 410 and the signal processing module 420. Further, in some examples, the attachment module 415 and the attachment module 425 may additionally include mechanical features, such as complementary ridges 450, 452 in the housing of the respective modules, such that the modules 410 and 420 may be detachably coupled without slippage between the modules 410 and 420, thereby further ensuring the stability of the inductive coupling 430 between the modules 410 and 420.

The sensing module 410 further comprises a communication module 416 while the signal processing module 420 comprises a communication module 426. The communication module 416 and the communication module 426 are configured to provide a wireless data and power communication between the sensing module 410 and the signal processing module 420. For example, the communication module 416 and the communication module 426 when spatially aligned and positioned within a threshold distance to each other may be configured to create an inductive coupling 430 between the modules 416 and 426. In this way, the pre-processing module 414 of the sensing module 410 wirelessly transmits the physiological signals acquired by the sensors 411 to the signal processing module 420 via the communication module 416. The processor 422 of the signal processing module 420 then receives the physiological signals wirelessly transmitted from the sensing module 410 via the communication module 426 of the signal processing module 420. In one embodiment, the communication module 416 and the communication module 426 comprise inductive coupling devices, such that the physiological signals are wirelessly communicated between the sensing module 410 and the signal processing module 420 via inductive data transfer of the inductive coupling 430. For example, the communication module 416 and the communication module 426 may each comprise one or more coils configured to wirelessly transfer data according to an inductive coupling data transfer protocol. Further, the communication module 426 may be configured to wirelessly transmit power from the power supply 424 of the signal processing module 420 to the communication module 416 via the inductive coupling 430, such that the power supply 424 may wirelessly power the sensing module 410.

The communication module 416 and the communication module 426 may comprise one or more pairs of inductive coils 440. The one or more pairs of inductive coils 440 may be a single pair of inductive coils, including one coil for each of the communication modules 416 and 426, such that the power and data are transferred via inductive coupling 430 of the same pair of inductive coils. In other embodiments, the one or more pairs of inductive coils 440 may comprise two or more pairs of inductive coils, including at least two inductive coils for each of the communication module 416 and the communication module 426, such that at least a first pair of inductive coils transfers data between the sensing module 410 and the signal processing module 420 while a second pair of inductive coils transfers power between the sensing module 410 and the signal processing module 420. In such embodiments wherein the one or more pairs of inductive coils 440 comprise at least two pairs of inductive coils, the inductive coils may be arranged concentrically, wherein the radius of one pair of inductive coils is greater than the radius of another pair of inductive coils. In some embodiments wherein the one or more pairs of inductive coils 440 comprise at least two pairs of inductive coils, the pairs of inductive coils may be positioned away from each other within the respective modules 410 and 420.

The physiological signals acquired from the patient via the sensors 411 and wirelessly transmitted via the inductive coupling 430 may be further processed via the processor 422 of the signal processing module 420. An example method for controlling the signal processing module 420 with the processor 422 is described further herein with regard to FIG. 6. The signal processing module 420 may further comprise a memory 421, such as a non-transitory memory, configured with executable instructions that are executable by the processor 422. Further, the memory 421 may store the physiological signals received from the sensing module 410 in the event of loss of transmission with sensing module 410.

In some examples, the signal processing module 420 further comprises an external communication module 423, such as a radio, for transmitting physiological data acquired via the sensing module 410 to an output device 480.

The signal processing module 420 may be housed within a housing 428, for example, that is adapted to positioned adjacent to the sensing module 418 for wirelessly obtaining physiological data via the sensors 411 in the fabric cover 402. As mentioned hereinabove, the housing 428 may be adapted with complementary ridges or other physical features 452 relative to physical features 450 of the housing 418 of the sensing module 410, to further secure the modules 410 and 420 when the modules 410 and 420 are detachably coupled via the attachment modules 415 and 425. The housings 418 and 428 may thus be configured such that the communication modules 416 and 426 are spatially aligned and within a threshold distance of each other when the sensing module 410 and signal processing module 420 are detachably coupled.

While a wireless communication between the communication module 416 and the communication module 426 is described hereinabove, it should be appreciated that in some examples, the physiological data acquisition system 400 may optionally include a wired connection 495 between the communication modules 416 and 426. Such a wired connection 495 may provide communication and power between the sensing module 410 and the signal processing module 420, such that the sensing module 410 of the fabric cover 402 may be used for long-term monitoring which may benefit from frequent changes and/or charging to the power supply 424 (e.g., a battery). If the sensing module 410 and the signal processing module 420 are connected via the wired connection 495, power transfer and data communication may occur via the wired connection 495 rather than via the inductive coupling 430. That is, when the wired connection 495 is provided between the communication modules 416 and 426 of the sensing module 410 and the signal processing module 420, respectively, the wired connection 495 overrides the wireless connection via the inductive coupling 430 for providing power transfer and data communication between the communication modules 416 and 426. If the wired connection 495 becomes disconnected between the communication modules 416 and 426, but inductive coupling 430 is still established, power transfer and data communication between the communication modules 416 and 426 may therefore carry over to the inductive coupling 430.

Figure 5:
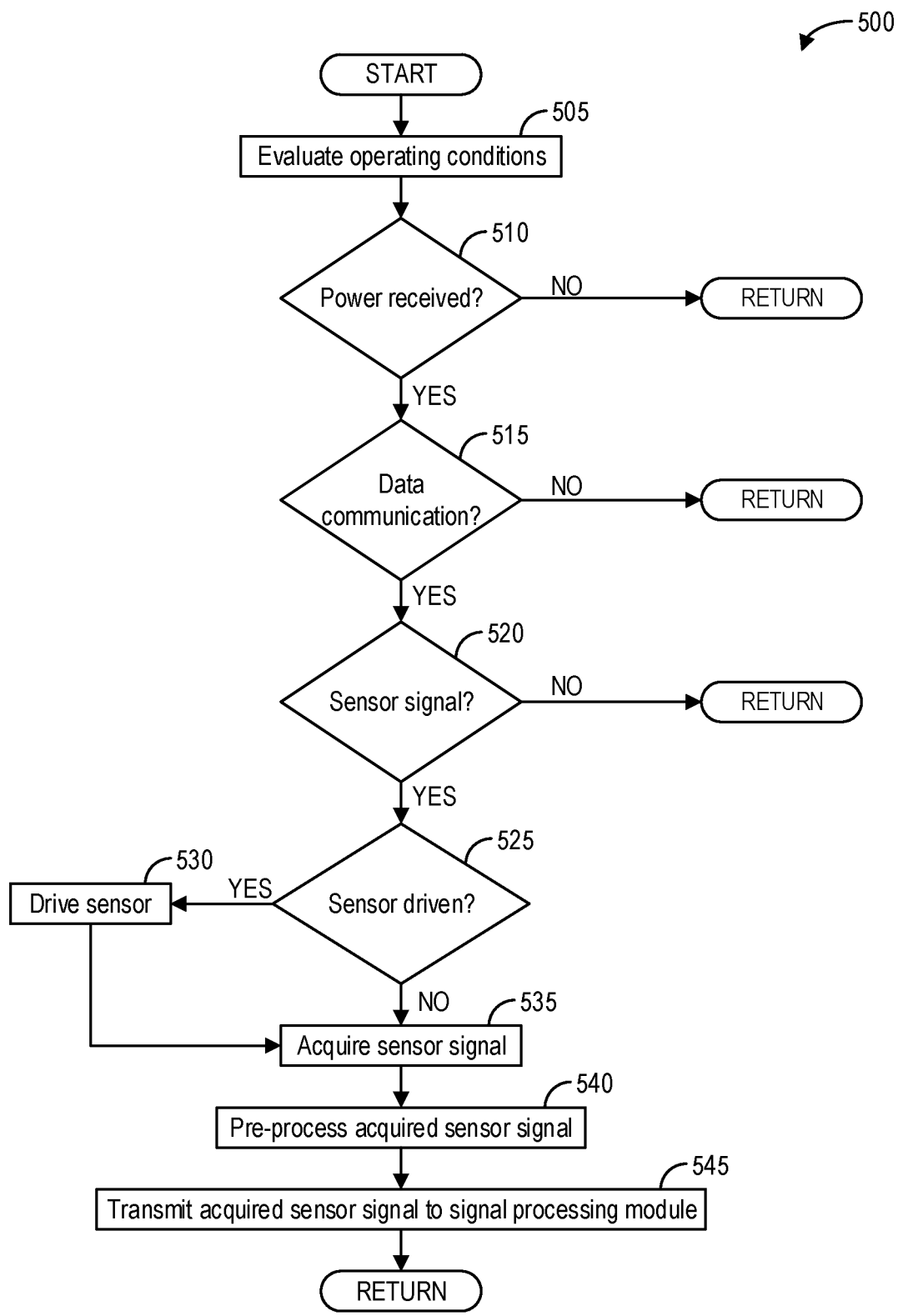
FIG. 5 shows a high-level flow chart illustrating an example method for acquiring physiological data from a patient and wirelessly transmitting the physiological data via an inductive coupling.

FIG. 5 shows a high-level flow chart illustrating an example method 500 for pre-processing and transmitting sensor data. In particular, method 500 relates to acquiring and pre-processing data from a plurality of sensors with a sensing module, such as the sensing module 410. Method 500 is described with regard to the systems and components of FIGS. 1-4, though it should be appreciated that the method 500 may be implemented with other systems and components without departing from the scope of the present disclosure. For example, method 500 may be implemented as executable instructions in non-transitory memory 413 of the sensing module 410 and may be executed by the pre-processing module 414 to perform the actions described herein below.

Method 500 begins at 505. At 505, method 500 evaluates operating conditions. Operating conditions may include, as illustrative and non-limiting examples, whether the sensing module 410 is powered, whether the sensing module 410 is in communication with the signal processing module 420, whether the sensors 411 are acquiring data, whether one or more sensors of the sensors 411 are driven, and so on. Method 500 may evaluate whether the sensing module 410 is powered by measuring an amount of power wirelessly transferred to the sensing module 410 from the signal processing module 420 via the inductive coupling 430 between the communication modules 416 and 426. Method 500 may evaluate whether the sensing module 410 is in data communication with the signal processing module 420 by transmitting and/or receiving a data packet via the communication module 416. Method 500 may evaluate whether the sensors 411 are acquiring data by measuring output of the sensors 411. For example, in examples wherein the each sensor of the sensors 411 comprises an electrode adapted to measure bio-potentials of the patient in direct contact with a surface of the sensors 411, method 500 may evaluate whether the sensors 411 are acquiring data by measuring impedance with each of the sensors 411.

After evaluating operating conditions at 505, method 500 continues to 510. At 510, method 500 determines whether the sensing module 410 is powered, for example, by determining whether the sensing module 410 is receiving power from the signal processing module 420. For example, the signal processing module 420 may include a power supply 424, such as a battery, to provide electrical power to components of the signal processing module 420, and furthermore, the signal processing module 420 may wirelessly transfer power from the power supply 424 via the communication module 426. For example, the signal processing module 420 may transfer power via an inductive coupling 430 between the communication module 426 and the communication module 416 of the sensing module 410. In some examples, method 500 may further determine whether the power received via the inductive coupling 430 of the communication module 416 from the signal processing module 420 is sufficient for powering the sensing module 410, for example by determining whether the power is above a threshold power. The threshold power may comprise the minimum power for providing functionality of the sensing module 410, as an illustrative example. Thus, if power is not wirelessly received from the signal processing module 420 ("NO") or if the power received is not above the threshold power, then method 500 returns.

However, if there is sufficient power ("YES"), then method 500 continues to 515. At 515, method 500 determines whether there is data communication with the signal processing module 420. For example, data communication between the sensing module 410 and the signal processing module 420 occurs wirelessly via the inductive coupling 430 between the communication module 416 of the sensing module 410 and the communication module 426 of the signal processing module 420. For example, respective inductive coils of the communication modules 416 and 426 provide wireless data transfer between the sensing module 410 and the signal processing module 420. Thus, if the respective inductive coils are properly aligned and within a threshold distance of each other, despite not being in direct electrical contact, then the inductive coupling 430 is established and wireless data communication between the communication modules 416 and 426 may occur. However, if the respective inductive coils are not aligned and/or are not within the threshold distance of each other, then data communication between the sensing module 410 and the signal processing module 420 may not occur. If there is no data communication with the signal processing module 420 ("NO"), then method 500 returns.

However, referring again to 515, if the sensing module 410 is in wireless data communication with the signal processing module 420 ("YES"), then method 500 continues to 520. At 520, method 500 determines whether at least one sensor is measuring a signal from the patient. For example, a sensor signal exists if at least one of the sensors 411 is in contact with the skin of the patient, such as direct, face-sharing contact (e.g., wherein at least a portion of a surface of a sensor is directly contacting at least a portion of a surface of the skin of the patient). Thus, if no sensors are in contact with the skin of the patient and there is no signal from at least one sensor ("NO"), then method 500 returns.

However, if there is at least one sensor signal ("YES"), then method 500 proceeds to 525. At 525, method 500 determines whether the sensors 411 include at least one driven sensor. For example, the sensors 411 may include at least one driven sensor if the sensors 411 comprises electrodes for acquiring ECG measurements, and specifically if at least one sensor of the sensors 411 is configured for providing a driven common-mode output signal to the skin of the patient in order to reduce common-mode interference. If the sensors 411 include a driven sensor ("YES"), then method 500 proceeds to 530. At 530, method 500 drives the driven sensor with a driven common-mode output signal. Method 500 then proceeds to 535. Referring again to 525, if the sensors 411 do not include at least one driven sensor ("NO"), then method 500 proceeds from 525 to 535.

At 535, method 500 acquires the sensor signal from at least one sensor of the sensors 411. For example, in examples wherein the sensors 411 comprise ECG electrodes, method 500 acquires ECG data collected by the electrodes or the sensors 411 in direct or face-sharing contact with the skin of the patient.

At 540, method 500 optionally pre-processes the acquired signal(s) from the sensors 411. For example, method 500 may pre-process the acquired signal(s) to compress or reduce the size of the acquired signal(s) in accordance with bandwidth limitations of the inductive coupling 430 between the sensing module 410 and the signal processing module 420. The pre-processing may additionally or alternatively include filtering the acquired signal(s) to reduce noise.

At 545, method 500 transmits the signal(s) to the signal processing module 420 via the communication module 416. For example, method 500 transmits the signals wirelessly, for example, via the inductive coupling 430 to the signal processing module 420. Method 500 then returns.

Thus, a method for wirelessly obtaining physiological data from a patient includes acquiring signals from one or more sensors or electrodes in contact with the skin of the patient, and wirelessly transmitting the acquired signals to a signal processing module. The acquired signals may be wirelessly transmitted via an inductive coil spatially aligned with a respective inductive coil of the signal processing module. The acquired signals may be pre-processed to reduce noise and/or accommodate speed and bandwidth limitations of the wireless communication between the inductive coils.

FIG. 6 shows a high-level flow chart illustrating an example method 600 for processing signals from a sensing module. In particular, method 600 relates to wirelessly obtaining physiological signals via an inductive coupling with a signal processing module, such as the signal processing module 420. Method 600 is described with regard to the systems and components of FIGS. 1-4, though it should be appreciated that the method 600 may be implemented with other systems and components without departing from the scope of the present disclosure. For example, method 600 may be implemented as executable instructions in non-transitory memory 421 of the signal processing module 420 and may be executed by the processor 422 to perform the actions described herein.

Method 600 begins at 605. At 605, method 600 evaluates operating conditions. For example, method 600 evaluates operating conditions of the signal processing module 420. As one example, the operating conditions of the signal processing module 420 may include whether the signal processing module 420 is communicatively coupled to the sensing module 410. Method 600 may evaluate whether the signal processing module 420 is in data communication with the sensing module 410 by transmitting and/or receiving a data packet via an inductive coupling between the communication module 416 and the communication module 426.

At 610, method 600 determines whether a sensing module is connected to the signal processing module. For example, method 600 determines whether the sensing module 410 is communicatively coupled to the signal processing module 420. The sensing module 410 is communicatively coupled to the signal processing module 420 if the communication modules 416 and 426 of the modules 410 and 420, respectively, are spatially aligned and within a threshold distance of each other such that the communication modules 410 and 420 are inductively coupled and power and/or data communication may occur therebetween.

If the sensing module 410 is not connected ("NO"), method 600 proceeds to 615. At 615, method 600 generates a notification of the sensing module disconnection. For example, method 600 may generate a notification that the sensing module 410 is not connected to the signal processing module 420, and the notification may be output via the one or more output devices 222. The notification may comprise a visual notification displayed via a display device, for example. Additionally or alternatively, the notification may comprise an audio notification output via an audio output device (e.g., a speaker). It should be appreciated that method 600 may notify the user via other techniques. As an illustrative and non-limiting example, the signal processing module 420 may include an LED configured to illuminate when the power and/or data communication with the sensing module 410 is interrupted or disconnected. After generating and outputting the notification of the disconnection, method 600 returns.

However, referring again to 610, if the sensing module 410 is connected ("YES"), method 600 continues to 620. At 620, method 600 transmits a driven signal to the sensing module 410 for driving a driven sensor. For example, method 600 may transmit, via the wireless communication module 426, a driven common-mode output signal to the sensing module 410, which receives the driven common-mode output signal via the wireless communication module 416. The driven common-mode output signal may comprise a voltage or current, for example, that is wirelessly transmitted via the inductive coupling between the communication modules 416 and 426. The sensing module 410 may then drive the driven sensor or electrode according to the driven common-mode output signal in order to reduce or eliminate common-mode interference during data acquisition.

Continuing at 625, method 600 receives one or more sensor signals from the sensing module. For example, method 600 may receive raw or unprocessed physiological signals acquired via one or more sensors 411 of the sensing module 410 which are then transmitted from the sensing module 410 via the inductive coupling between the communication modules 416 and 426. In such examples, the sensing module 410 may transmit each signal acquired via each of the sensors 411. As another example, method 600 may receive processed signals acquired via the sensors 411. For example, the sensing module 410 may include a pre-processing module 414 configured to pre-process signals acquired via the sensors 411, for example to derive or obtain an electrocardiogram signal from the raw physiological signals acquired via one or more sensors 411. Method 600 may therefore receive such processed or pre-processed signals from the sensing module 410.

At 630, method 600 may optionally process the received signal(s). For example, if method 600 received all raw signals from each of the sensors 411, method 600 may process the raw signals to determine a physiological signal such as an electrocardiogram. Method 600 may additionally or alternatively filter or otherwise process the received signal(s) to reduce noise and/or measure one or more physiological parameters indicative of the physiological state of the patient.

At 635, method 600 outputs the processed signal(s). For example, method 600 may output the processed signal(s) via an external communication module 423, such as a radio, to an external computing system for review and/or storage at the external computing system. As another example, method 600 may output the processed signal(s) via one or more output devices 222 for display to a user. Additionally or alternatively, method 600 may output the processed signal(s) to memory, for example, so that the processed signal(s) may be subsequently retrieved. After outputting the processed signal(s), method 600 returns.

Thus, a method for a signal processing module such as the signal processing module 212 or 420 comprises wirelessly receiving, from a sensing module such as the sensing module 410, one or more signals acquired via one or more sensors of the sensing module, the signals corresponding to physiological data of a patient in contact with at least one of the one or more sensors.

FIG. 7 shows a high-level flow chart illustrating an example method 700 for dynamically selecting sensor output for a plurality of sensors according to an embodiment. In particular, method 700 relates to determining which sensors of a plurality of sensors, if any, are suitable for data collection. Method 700 is described with regard to the systems and components of FIGS. 1-4, though it should be appreciated that the method 700 may be implemented with other systems and components without departing from the scope of the present disclosure. For example, method 700 may be implemented as executable instructions in non-transitory memory 413 of the sensing module 410 and may be executed by the pre-processing module 414 to perform the actions described herein below.

Method 700 begins at 705. At 705, method 700 begins monitoring a patient. Method 700 may begin monitoring the patient, for example, responsive to the patient being positioned on the fabric cover 402 such that at least one of the sensors 411 is in direct contact with the patient. Additionally or alternatively, method 700 may begin monitoring the patient responsive to a command by a user to begin monitoring the patient. Such a command may be received, for example, via a user interface of the signal processing module 420 and/or a user interface of the output device 480, in which case the command may be received via the external communication module 423.

At 710, method 700 evaluates the operating conditions of each sensor of a plurality of sensors. For example, method 700 may evaluate the operating conditions of each sensor of the sensors 411. To that end, method 700 may evaluate the signals, if any, acquired via each sensor to determine whether the sensor is in direct contact with the patient. Then, at 715, method 700 selects a subset of sensors from the plurality of sensors based on the operating conditions of each sensor. For example, method 700 may select a subset of sensors that are determined, based on the evaluated operating conditions, to be in direct contact with the patient. Furthermore, method 700 may select the subset of sensors based on the relative positions of the sensors. For example, method 700 may select at least one pair of sensors that are determined to be in direct contact with the patient while also having a greatest physical distance between the sensors, as the signals acquired via the pair of sensors may have an improved signal-to-noise ratio relative to another pair of sensors which are in direct contact with the patient but with a smaller physical distance between the sensors. Thus, method 700 may select each sensor that is in direct contact with the patient for the subset of sensors, or alternatively method 700 may select a subset of sensors from the set of sensors determined to be in direct contact with the patient based on the relative positioning of the sensors in the set of sensors.

Further, at 720, method 700 selects a sensor from the subset of sensors as a driven sensor. For example, in order to reduce common mode interference while measuring the small electrical signals from the patient via the sensors, a driven sensor may be selected for providing a driven common-mode output signal to the patient via the driven sensor such that the common mode interference is reduced or eliminated. The driven sensor may be selected from the subset of sensors based on the position of the sensor relative to the remaining sensors of the subset of sensors, such that when the selected driven sensor is driven with a driven common-mode output signal, the remaining sensors may measure electrical signals of the patient with reduced interference. To that end, at 725, method 700 drives the driven sensor with a driven common-mode output signal or driven signal. The driven common-mode output signal may comprise a voltage or current applied to the patient via the driven sensor. The driven common-mode output signal may thus comprise a signal representing voltage or current wirelessly received from the signal processing module 420, for example, via the inductive coupling between the sensing module 410 and the signal processing module 420.

At 730, method 700 acquires physiological data via remaining sensors of the subset of sensors. That is, while driving the driven sensor with the driven signal, method 700 measures electrical signals from the patient via the remaining sensors of the subset of sensors, wherein the electrical signals correspond to physiological data or physiological signals.

At 735, method 700 aggregates the acquired physiological data from the subset of sensors. For example, to acquire ECG data with a three-lead configuration, method 700 acquires physiological data via a pair of sensors (while the third lead is the driven sensor), and so method 700 aggregates the output of the pair of sensors. Similarly, for a five-lead or seven-lead configuration, method 700 aggregates the output of two or three pairs of sensors, respectively.

At 740, method 700 optionally pre-processes the aggregated physiological data. For example, method 700 may pre-process the aggregated physiological data by filtering the signals and/or deriving one or more physiological parameters or one or more reduced physiological signal (e.g., a differential signal between each pair of acquisition sensors) from the aggregated physiological data.

At 745, method 700 transmits the pre-processed aggregated physiological data to the signal processing module. For example, method 700 wirelessly transmits the pre-processed aggregated physiological data to the signal processing module 420 via the inductive coupling between the communication module 416 and the communication module 426.

At 750, method 700 determines whether the monitoring of the patient has ended. The monitoring of the patient may end, for example, responsive to a disconnection occurring between the sensing module 410 and the signal processing module 420. As another example, the monitoring of the patient may end responsive to a command received wirelessly from the signal processing module 420. As yet another example, the monitoring of the patient may end when the patient is no longer in direct contact with any of the sensors.

If the monitoring has not ended ("NO"), method 700 continues to 755. At 755, method 700 determines whether the operating conditions of the sensors has changed. If the operating conditions of the sensors have changed ("YES"), method 700 returns to 710, wherein method 700 re-evaluates the operating conditions of each sensor of the plurality of sensors in order to select, at 715, a new subset of sensors from the plurality of sensors based on the operating conditions.

However, referring again to 755, if the operating conditions of the sensors have not changed ("NO"), method 700 returns to 725, such that method 700 may continue driving the driven sensor and acquiring physiological data via the remaining sensors of the subset of sensors.

Method 700 thus continues to acquire physiological data via a subset of sensors, while dynamically selecting new sensors for acquiring physiological data when operating conditions of the sensors change. Once an indication that monitoring is ended is determined at 750 ("YES"), method 700 proceeds to 760. At 760, method 700 ends the monitoring of the patient. Method 700 then returns.

A technical effect of the disclosure includes the wireless transmission of physiological data from a plurality of sensors to a signal processing module via an inductive coupling. Another technical effect of the disclosure includes the wireless transmission of electrical current or voltage via an inductive coupling for driving a sensor with the electrical current or voltage. Yet another technical effect includes the wireless acquisition of physiological data from a patient via one or more sensors.

In one embodiment, a system comprises a plurality of sensors spaced apart from one another and adapted to measure physiological signals from a patient, and a communication module configured to wirelessly transmit the physiological signals measured by the plurality of sensors to a computing device.

In a first example of the system, the system further comprises a fabric cover, wherein the plurality of sensors are distributed across a surface of the fabric cover and are adapted to be placed in direct contact with the patient when the patient is positioned on the fabric cover. In a second example of the system optionally including the first example, the system further comprises a housing configured to enclose the communication module, the housing positioned within the fabric cover. In a third example of the system optionally including one or more of the first and second examples, the system further comprises at least one magnet positioned within the housing, the magnet configured to detachably couple the housing to a housing of the computing device. In a fourth example of the system optionally including one or more of the first through third examples, the communication module is aligned with a communication module of the computing device when the housing is detachably coupled to the housing of the computing device, and the communication module is configured to wirelessly transmit the physiological signals to the communication module of the computing device only when the communication module is aligned with the communication module of the computing device and the communication module is within a threshold distance of the respective communication module. In a fifth example of the system optionally including one or more of the first through fourth examples, the communication module comprises at least one coil configured to inductively couple to the computing device to wirelessly transmit the physiological signals to the computing device. In a sixth example of the system optionally including one or more of the first through fifth examples, the at least one coil is further configured to inductively couple to the computing device to wirelessly receive power transmitted from a power supply of the computing device. In a seventh example of the system optionally including one or more of the first through sixth examples, the system further comprises a processing module configured to pre-process the physiological signals, wherein the communication module wirelessly transmits the pre-processed physiological signals to the computing device. In an eighth example of the system optionally including one or more of the first through seventh examples, the processing module is configured with instructions in non-transitory memory that when executed cause the processing module to dynamically select a subset of sensors from the plurality of sensors based on operating conditions of the plurality of sensors, wherein the physiological signals are acquired via the subset of sensors.

In another embodiment, a system comprises a plurality of sensors spaced apart from one another and adapted to have direct contact with a patient, a sensing module comprising a first communication module, the sensing module coupled to the plurality of sensors and configured to acquire, via the plurality of sensors, physiological signals from the patient, and a signal processing module comprising a second communication module, wherein the sensing module wirelessly transmits the physiological signals via first communication module to the signal processing module, and wherein the signal processing module wirelessly receives the physiological signals via the second communication module.

In a first example of the system, the sensing module further comprises a first attachment module, and wherein the signal processing module further comprises a second attachment module, wherein the sensing module and the signal processing module are detachably coupleable via the first attachment module and the second attachment module, respectively, and wherein the sensing module only wirelessly transmits the physiological signals to the signal processing module when the sensing module and the signal processing module are detachably coupled via the first attachment module and the second attachment module, respectively, such that the first communication module and the second communication module are inductively coupled. In a second example of the system optionally including the first example, the first attachment module comprises a first magnet and the second attachment module comprises a second magnet. In a third example of the system optionally including one or more of the first and second examples, the system further comprises a fabric cover, wherein the plurality of sensors are distributed across a surface of the fabric cover and are adapted to be placed in direct contact with the patient when the patient is positioned on the fabric cover, and wherein the sensing module is integrated into the fabric cover. In a fourth example of the system optionally including one or more of the first through third examples, the sensing module further comprises a processing module configured to process the physiological signals acquired via the plurality of sensors and output an electrocardiogram signal of the patient with reduced noise, wherein the sensing module wirelessly transmits the electrocardiogram signal via the first communication module to the signal processing module. In a fifth example of the system optionally including one or more of the first through fourth examples, the signal processing module further comprises a power supply, and wherein the signal processing module wirelessly transmits, via the second communication module, power from the power supply to the sensing module for powering the sensing module.

In yet another embodiment, a method comprises acquiring, via a plurality of sensors distributed across a surface of a fabric cover, physiological signals from a patient positioned on the fabric cover, and wirelessly transmitting, via a communication device integrated into the fabric cover, the physiological signals to a computing device spatially aligned with and inductively coupled to the communication device.

In a first example of the method, the method further comprises processing, via a processing module integrated into the fabric cover, the physiological signals, wherein wirelessly transmitting the physiological signals to the computing device comprises wirelessly transmitting the processed physiological signals to the computing device. In a second example of the method optionally including the first example, the method further comprises dynamically selecting, via the processing module, a subset of sensors of the plurality of sensors for acquiring the physiological signals over time based on operating conditions of each sensor of the plurality of sensors. In a third example of the method optionally including one or more of the first and second examples, the method further comprises wirelessly receiving power, via the communication device, from a power supply of the computing device. In a fourth example of the method optionally including one or more of the first through third examples, the method further comprises driving a sensor of the plurality of sensors with a driven signal comprising at least a portion of the power wirelessly received from the power supply of the computing device. In a fifth example of the method optionally including one or more of the first through fourth examples, the method further comprises transmitting, via a wired connection between the communication device and the computing device rather than wirelessly, the physiological signals to the computing device responsive to the wired connection.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a plurality of sensors spaced apart from one another and adapted to measure physiological signals from a patient;
   a communication module configured to wirelessly transmit the physiological signals measured by the plurality of sensors to a computing device configured to process the physiological signals, wherein the communication module is configured to detachably couple to the computing device via magnets, and wherein the communication module wirelessly transmits the physiological signals and the computing device wirelessly transmits power to the communication module when the communication module is coupled to the computing device via the magnets;
   a fabric cover, wherein the plurality of sensors are distributed across a surface of the fabric cover and are adapted to be placed in direct contact with the patient when the patient is positioned on the fabric cover, wherein the fabric cover is a blanket, bed sheet, or mattress cover;
   a dynamic switching circuit, wherein the dynamic switching circuit selects which sensors measure physiological signals based on operating conditions of the plurality of sensors;
   a pre-processing module configured to pre-process the physiological signals at the fabric cover, wherein the pre-processing module comprises the dynamic switching circuit, wherein the communication module wirelessly transmits the pre-processed physiological signals to the computing device, and wherein the pre-processing module is configured to aggregate, filter, and/or compress the physiological signals at the fabric cover;
   a processor of the computing device, wherein, after receiving the pre-processed physiological signals from the communication module, the processor further processes the pre-processed physiological signals to reduce noise and/or measure one or more physiological parameters indicative of a physiological state of the patient; and
   an external communication module of the computing device that communicates with an output device;
   wherein the communication module and the computing device comprise two pairs of inductive coils, a first pair of the two pairs configured to wirelessly transmit the physiological signals from the communication module to the computing device, a second pair of the two pairs configured to wireless transmit power from the computing device to the communication module, wherein the two pairs are arranged concentrically, and wherein a first radius of one pair of the two pairs is greater than a second radius of another pair of the two pairs.

2. The system of claim 1, further comprising:
   a housing configured to enclose the communication module and the pre-processing module but not the plurality of sensors, the housing positioned within the fabric cover and sealed from external elements; and
   at least one magnet of the magnets positioned within the housing, the at least one magnet configured to detachably couple the housing to a second housing of the computing device;
   wherein the housing and the second housing comprise complementary ridges which engage together without slippage when the housing is detachably coupled to the second housing.

3. The system of claim 2, wherein the communication module is aligned with a communication module of the computing device when the housing is detachably coupled to the housing of the computing device, and wherein the communication module is configured to wirelessly transmit the physiological signals to the communication module of the computing device only when the communication module is aligned with the communication module of the computing device and the communication module is within a threshold distance of the respective communication module.

4. The system of claim 1, wherein each of the plurality of sensors is rectangular, and wherein the plurality of sensors comprises a top sensor, a bottom sensor, and four central sensors, wherein the four central sensors are located between the top sensor and the bottom sensor, and wherein the four central sensors are arranged in two rows, wherein each of the two rows has two of the four central sensors.

5. The system of claim 1, wherein the dynamic switching circuit selects which of the plurality of sensors measure the physiological signals based on a position of the patient on the fabric cover, wherein the plurality of sensors in contact with the patient measure the physiological signals, and wherein the dynamic switching circuit is integrated in the fabric cover.

6. The system of claim 1, wherein the plurality of sensors are not of uniform shape.

7. The system of claim 1, wherein the plurality of sensors comprises a first subset of sensors and a second subset of sensors, and wherein the first subset of sensors are dedicated, driven electrodes and the second subset of sensors are measurement electrodes switchable between a measurement mode and a driven mode.

8. A system, comprising:
   a plurality of sensors spaced apart from one another and adapted to have direct contact with a patient;
   a sensing module comprising a first communication module and a dynamic switching circuit, the sensing module coupled to the plurality of sensors and configured to acquire, via the plurality of sensors, physiological signals from the patient, wherein the dynamic switching circuit dynamically selects which of the plurality of sensors measures the physiological signals from the patient based on a position of the patient; and
   a signal processing module comprising a second communication module and a power supply, wherein the sensing module wirelessly transmits the physiological signals via the first communication module to the signal processing module and the signal processing module wirelessly receives the physiological signals via the second communication module when the first communication module is aligned with the second communication module, wherein the signal processing module wirelessly transmits, via the second communication module, power from the power supply to the sensing module for powering the sensing module when the first communication module is aligned with the second communication module, and wherein the first communication module and the second communication module align via attachment modules;
   wherein the physiological signals are pre-processed at the sensing module prior to transmission via the first communication module to the signal processing module, wherein the physiological signals are further processed at the signal processing module, and wherein after processing at the signal processing module, the physiological signals are sent to an output device via an external communication module of the signal processing module; and
   wherein the sensing module further comprises a first attachment module comprising a first magnet and first ridges, wherein the signal processing module further comprises a second attachment module comprising a second magnet and second ridges complementary to the first ridges, wherein the first ridges and the second ridges engage together without slippage when aligned, wherein the sensing module and the signal processing module are detachably coupleable via the first magnet, the second magnet, the first ridges, and the second ridges, and wherein the sensing module only wirelessly transmits the physiological signals to the signal processing module when the sensing module and the signal processing module are detachably coupled via the first attachment module and the second attachment module, respectively, such that the first communication module and the second communication module are inductively coupled.

9. The system of claim 8, further comprising a fabric cover, wherein the plurality of sensors are distributed across a surface of the fabric cover and are adapted to be placed in direct contact with the patient when the patient is positioned on the fabric cover, and wherein the sensing module is integrated into the fabric cover, and wherein the fabric cover is a blanket, bed sheet, or mattress cover.

10. The system of claim 9, wherein the sensing module further comprises a processing module configured to process the physiological signals acquired via the plurality of sensors and output an electrocardiogram signal of the patient with reduced noise, wherein the sensing module wirelessly transmits the electrocardiogram signal via the first communication module to the signal processing module.

11. The system of claim 8, wherein the first magnet is positioned on a first housing of the sensing module and wherein the second magnet is positioned on a housing of the signal processing module.

12. A method, comprising:
   dynamically selecting, via a pre-processing module integrated into a fabric cover, a subset of sensors of a plurality of sensors to measure physiological signals from a patient based on operating conditions of each sensor of the plurality of sensors, wherein the plurality of sensors are distributed across a surface of the fabric cover;
   acquiring, via the subset of the plurality of sensors, the physiological signals from the patient;
   pre-processing, via the pre-processing module integrated into the fabric cover, the physiological signals, wherein pre-processing the physiological signals comprises aggregating, filtering, and/or compressing the physiological signals;
   wirelessly transmitting, via a communication device integrated into the fabric cover, the pre-processed physiological signals to a computing device spatially aligned with and inductively coupled to the communication device, wherein the communication device and the computing device have complementary ridges that engage together without slippage when the communication device and the computing device are spatially aligned, and wherein the complementary ridges are physical features;
   processing, via a processing module of the computing device, the pre-processed physiological signals;
   outputting the processed physiological signals to an external system; and
   displaying, via the external system, the processed physiological signals to a user.

13. The method of claim 12, further comprising wirelessly receiving power, via the communication device, from a power supply of the computing device.

14. The method of claim 12, further comprising transmitting, via a wired connection between the communication device and the computing device, the physiological signals to the computing device responsive to the wired connection.

15. The method of claim 12, wherein the pre-processing module and the communication device are positioned within a housing of the fabric cover that is sealed from external elements, and wherein the plurality of sensors are distributed across the surface of the fabric cover outside of the housing.

* * * * *